United States Patent Office 2,792,674
Patented May 21, 1957

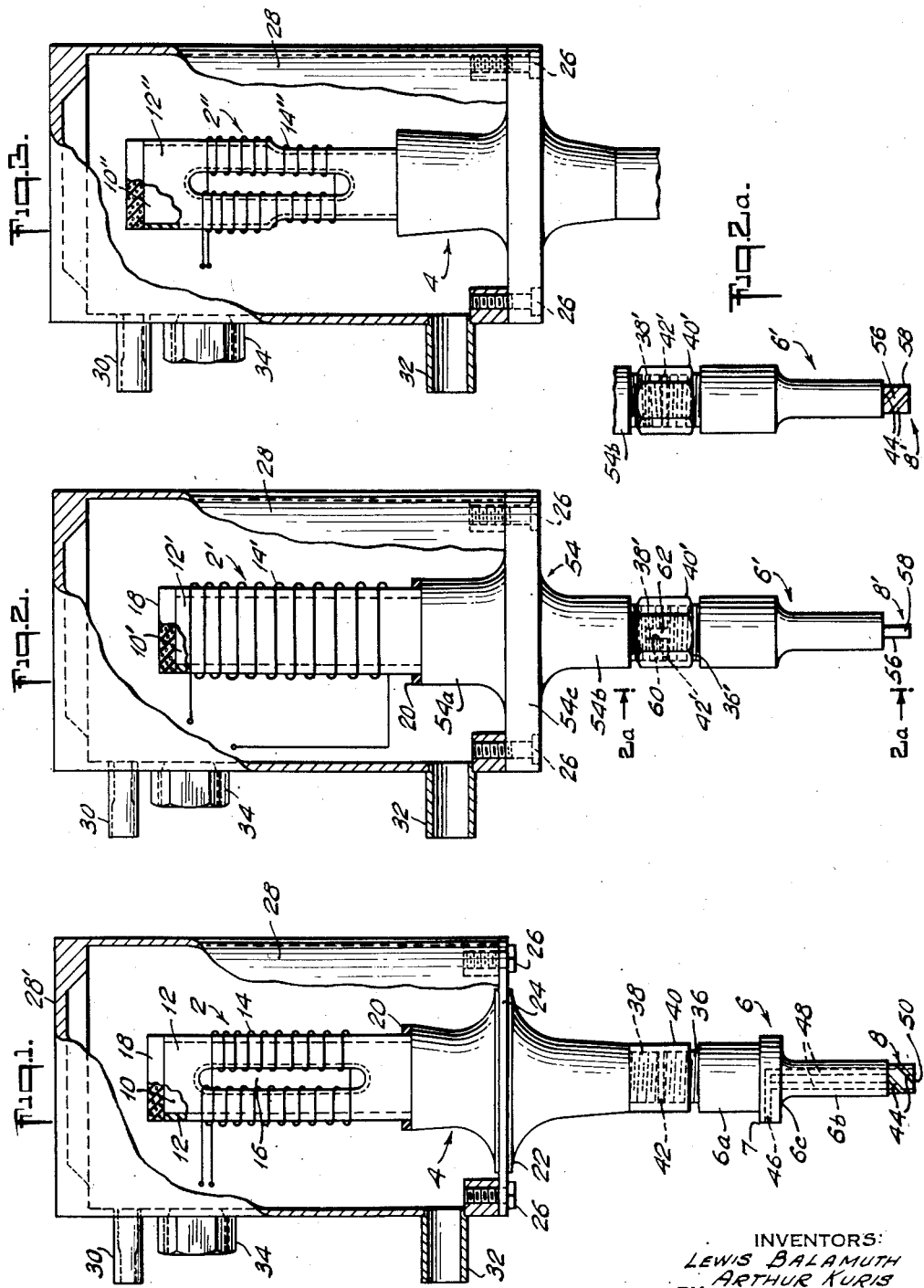

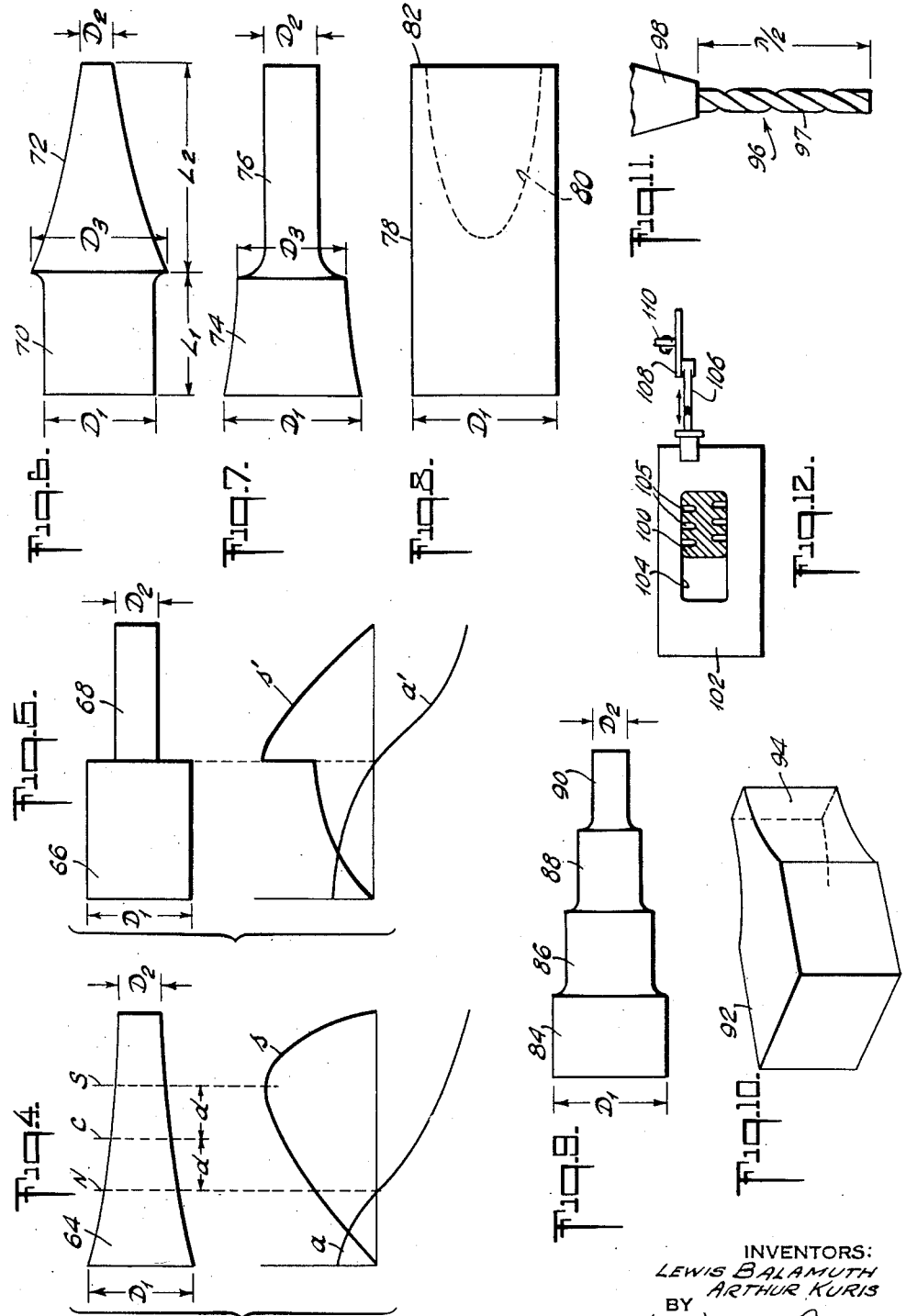

2,792,674

VIBRATORY MACHINE TOOL

Lewis Balamuth, Sunnyside, and Arthur Kuris, Bronx, N. Y., assignors to Cavitron Corporation, a corporation of New York Application March 19, 1954, Serial No. 417,407

15 Claims. (Cl. 51—64)

The present invention relates to the art of ultrasonic machining of materials, that is, to cutting, grinding, boring, or otherwise altering the configuration of materials including relatively hard and brittle materials, by means of a tool vibrated at sonic or ultrasonic frequencies as described in U. S. Patent No. 2,580,716 to Lewis Balamuth, one of the applicants named herein. The invention comprises improved apparatus for carrying out the process of the said patent and novel acoustical impedance transformers and tools so correlated to each other as to insure optimum performance of specific machining operations.

In the ultrasonic machining process as described in the said patent and as currently practiced, a tool is vibrated at ultrasonic frequencies and its end pressed against a work piece. The inertia of the work piece is such that it can not follow the movement of the vibrating tool. Accordingly a minute space will occur between the tool and the work during each vibration of the tool. Finely divided abrasive in a liquid carrier, which is flowed about the vibrating tool end while the pressure between the tool and work is maintained, enters this minute space between the tool and work and flows over and on the surface of the adjacent work piece. Cutting is effected by the abrasive particles, the tool determining the resulting configuration of the work piece. Apparatus for performing this process comprises a driver element which includes a suitable electromechanical transducer, for example a magnetostrictive transducer, a tool holder connected to the driver, preferably removably connected thereto, and a tool fixed to the holder. For optimum performance the overall length of driver, tool holder and tool is so correlated to the frequency of the compressional waves generated by the transducer that a loop of motion occurs substantially at the operating end of the tool. Preferably, to insure maximum amplitude of vibration of the tool end, the tool holder is so constructed that magnification of the amplitude of vibration results.

Various problems arose when attempts were made to construct apparatus of the above briefly described type which would be suitable for a wide variety of machining operations, would require the least possible redesign for use with tools of different shape and size, would transmit and magnify the amplitude of compressional waves without mechanical failure at sections of maximum stress and would utilize efficiently the power delivered thereto.

These problems, which have been solved by the present invention, can be briefly summarized.

When a tapered tool holder having an exponential taper and whose length is approximately a half wavelength or an integral multiple of a half wavelength in the material of the holder at the operating frequency is employed, the maximum amplification of vibration amplitude obtainable is the square root of the ratio of the maximum to minimum cross-sectional areas. If a particular application requires a tool with a relatively large cross-section, such type tool holder is unsatisfactory because, for any substantial magnification too large an area would be required at the input end. Furthermore, even when tools of small cross-section are to be used, maximum stress in a tapered holder occurs in a region of relatively small cross-section and not at a nodal point, thus mechanically weakening the holder. In accordance with the present invention an acoustical impedance transformer is provided in which any desired magnification can be obtained without undue increase in cross-section, and maximum stress can be made to occur at or near a nodal point where reinforcement may be provided.

The compressional wave generator, which in practice is ordinarily a magnetostrictive device, generates heat during operation of the equipment and therefore is usually water cooled. The pressure of water on the generator has reduced its efficiency as it effectively loads the end thereof at which a loop of motion occurs. The adverse effect of this water pressure on the generator has been overcome in the apparatus of the present invention by the provision of a protective layer of water-impervious air-containing material, specifically rubber containing closed air cells. Generators so protected have been found to have increased acoustical power output. For example, the amplitude of the vibration of a tool may be increased by as much as 15%.

Tools are ordinarily brazed to the ends of tool holders and tool holders are designed with reference to the tools which are to be attached thereto. This requires that the holders should be readily removable from the driver. When the tool holder comprises the sole intermediary between the transducer and tool and the sole acoustical impedance transformer of the equipment, mechanical difficulties have been encountered in effecting a proper junction between transducer and holder that will insure proper transference of vibrational energy, and that will not interfere with proper support of the assembly or with the cooling system. In accordance with the present invention an acoustical impedance transformer, separate and distinct from the tool holder and including support means for the equipment, is built into and forms part of the driver and novel means are provided for readily coupling different tool holders to such transformer with maximum efficiency in transference of energy and preferably with fixed orientation of the tool.

In order to practice the ultrasonic machining process of the said Balamuth patent it is essential that the abrasive which does the actual cutting be continually available at the work piece. In certain operations, for example in trepanning and grinding operations, difficulty has been encountered in insuring such continued supply of abrasive. Continual flow of the liquid carrying the abrasive also serves in great part to remove the cut material of the work piece which, if allowed to accumulate, can interfere with the normal cutting process. In accordance with the present invention continued flow of liquid carried abrasive and continued removal of material is facilitated in certain operations by providing strategically located passages or grooves either in the tool holder or tool, or both.

Pressure which, in certain operations, builds up between the working surface of a tool and the work piece, interferes with the cutting operation by reducing the rate of cutting. Such build-up of pressure and consequent reduction of cutting rate is avoided when the tool is provided with one or more grooves intersecting the work surface of the tool at an angle less than 90 degrees.

These and other features of the invention, including an improved tool particularly suitable for use when deep holes are to be formed in a work piece, and improved tool holders for use with trepanning tools, will be explained more fully as the description proceeds.

The invention will be described with reference to the accompanying drawings, of which:

Fig. 1 is a side view, partly in section, of an improved vibratory machine embodying the invention;

Fig. 2 is a view generally similar to Fig. 1 but illustrating a different coupling means between the driver unit and the tool holder;

Fig. 2a is a fragmentary view taken on the line 2a—2a of Fig. 2;

Fig. 3 is a side view, partly in section, of a driver unit including a modified form of transducer;

Figs. 4 and 5 are diagrams of acoustical impedance transformers and graphs explanatory of certain features of the invention;

Figs. 6, 7, 8 and 9 are side views of acoustical impedance transformers embodying the invention;

Fig. 10 is an isometric view of another form of acoustical impedance transformer embodying the invention;

Fig. 11 is a view of a tool particularly adapted for forming deep holes; and

Fig. 12 is a horizontal sectional view through a tool particularly adapted for use in grinding operations, the diagram showing also means for macroscopically moving the work piece relative to the tool.

In Fig. 1, to which reference may now be had, a specific embodiment of a vibratory machine embodying the invention is illustrated. The machine comprises in general a generator 2 of mechanical vibrations, an acoustical impedance transformer 4, a tool holder 6, and a tool 8. The generator 2 and transformer 4 together comprise the driver unit of the equipment. The generator 2 in the particular embodiment illustrated comprises a plurality of identical laminations 10 of magnetostrictive material, as for example nickel, sandwiched between protective sheets 12 of rubber backed fiberglass or the like, and a winding 14 adapted to carry high frequency current, the winding being shown diagrammatically only in the drawing. A longitudinal slot 16 is formed in each of the laminations 10 and cover sheets 12 and the winding 14 is threaded through the slot. The length of the laminations is so selected with reference to the desired frequency of vibrations to be imparted to the tool 8 that the laminated body will be resonant at such frequency and therefore standing waves will be set up therein with a loop of motion at each end. For this purpose the length of the laminated body should be an integral number of half wavelengths of such compressional waves induced by magnetostriction as a result of high frequency current delivered to the winding 14. As in usual practice, a biasing direct current will be supplied to the coil 14 in addition to the high frequency current initiating the compressional waves. The lower end of the generator 2 is fixedly secured to the upper end of the transformer 4 as by welding or soldering. The upper and free end of the generator 2 has a cap 18 of water-impervious air-containing material applied thereto. The purpose of the cap 18 will become apparent as the description proceeds. If, as in the embodiment illustrated in Fig. 1, the cross-sectional area of the transformer 4 at its junction with the generator 2 is larger than that of the magnetostrictive body, a ring 20 of material similar to that of the cap 18 is positioned about the lower end of the laminated body to cover the exposed part of the upper end of transformer 4. The transformer 4, which is likewise of a length equal to an integral number of half wavelengths of the generated compressional waves, is generally conical in shape but has an enlarged section 22 intermediate its ends and nearer to the upper than to the lower end of the transformer. This enlarged section 22 is in the general area of the nodal plane of motion and serves as the section to which support means for the equipment is attached. As shown in Fig. 1, a flange 24 is welded or soldered to the enlarged cross-sectional part 22 of the transformer 4 and to this flange 24 is connected, as by bolts 26, an enclosure 28 for the generator 2 and upper portion of the transformer 4. The enclosure 28 has an inlet 30 for cooling fluid, preferably water, and an outlet conduit 32 at the lower end of the enclosure. Preferably conduit 32 has a greater cross-sectional area than conduits 30 to insure that water will not build up within the housing 28. An electrical outlet 34 for the leads from winding 14 is secured to the side wall of the housing 28. The upper wall 28' of the housing 28 is preferably provided with suitable means (not shown) for attachment to any suitable rigid support means for the equipment and hence, for this purpose, this upper wall 28' is thicker than the side walls of the housing, as shown in the drawing. The water circulating through the housing serves to remove heat generated in the generator 2 during operation of the device. The water, however, creates pressure on the upper end of the generator and therefore has the effect of loading the generator and of lowering the efficiency of conversion of electrical to mechanical energy. The provision of the protective cap 18 containing air and impervious to water has been found to reduce, if not eliminate, the loading effect upon the transducer of the pressure of the water. The material of cap 18 may be, for example, rubber having closed air cells distributed therein, which material is now commercially available on the market under the trade name Rubatex. The ring 20 of such material similarly relieves the loading pressure of the water on the exposed upper area of the transformer 4.

The tool holder 6, in the particular embodiment of the invention illustrated in Fig. 1, is composed of two generally cylindrical sections 6a and 6b, which merge through a curved portion 6c, above which is a flange 7. The upper end of the tool holder is provided with an externally threaded cylindrical projection 36 having an upper smooth ground surface perpendicular to the axis of the tool holder and the lower end of the transformer 4 is formed with a similar externally threaded cylindrical projection 38 of a diameter equal to that of the projection 36. An internally threaded sleeve 40 threaded to the projections 36 and 38 permits the tool holder 6 to be brought into operative connection with the transformer. Interposed between the smooth flat end surfaces of the projection 36 and 38 is a thin disk 42 of copper or other deformable metal. With this arrangement no interruption in metallic contact between transformer and tool holder occurs over the major cross-sectional area of either, and particularly is there good metallic contact along the axes of these parts of the equipment. When, as in the above described coupling, good axial solid contact is obtained, transmission of vibration from transformer to tool holder is enhanced. Constructions wherein coupling between threaded male and female elements positioned at the axis of the parts is employed do not give such good transference of power because of the air space necessarily present in the base of the female member and because threaded areas in contact do not transmit high frequency acoustical vibrations.

In the flange 7 there is a transverse passage 46 which within the holder communicates with the upper ends of two longitudinal passages 48, the lower ends of which terminate at the end surface of the tool holder. These passages serve for delivery of fluid carried abrasive to the interior of the tool 8 which, in the case of Fig. 1, is hollow and therefore suitable for trepanning. Passage 46 is located substantially in the region of a node of motion, as will be explained in connection with the description of Fig. 5.

The tool is brazed to the lower end of the tool holder 6 and is provided with a plurality of diagonally disposed grooves 44 on its outer walls. The tool may have any desired configuration, depending upon the shape of hole to be made in the work piece. If the tool has a square cross-section, the hole formed by such tool will also be square.

Before description of the advantages of the particular shape of tool holder shown in Fig. 1 and the functioning of the grooves 44 in the tool, the overall operation of the machine of Fig. 1 will be briefly described, such operation being in general that of the process disclosed and claimed in the said Balamuth patent. When high frequency current is delivered to the winding 14 the laminated body expands and contracts, setting up compressional waves in the entire system, assuming of course that the frequency of the current delivered to the winding is such as to produce substantially standing waves in the various elements. The amplitude of the compressional waves at the loop of motion occurring at the junction of the generator 2 with the transformer 4 will be magnified by the transformer 4 due to its generally conical shape and therefore the amplitude at the junction of transformer 4 and the tool holder 6 will be greater in the general ratio of the maximum to minimum diameter of the transformer. The tool holder which also comprises an acoustical impedance transformer, will likewise serve to magnify the amplitude of vibration at a loop of motion. The magnification effected by the particular tool holder of Fig. 1 will be explained in more detail in connection with the diagram of Fig. 5. Thus the lower or working surface of the tool 8 which is located substantially at a loop of motion, will be vibrated at the frequency of the current delivered to the winding 14. Fluid carrying finely divided abrasive is continuously supplied to the vibrating end of the tool during the various operations. When holes or depressions corresponding in shape and dimensions to the lower surface of the tool are to be formed in a work piece, the work piece is held stationary and relative pressure between the tool and work piece in the direction of the longitudinal vibrations of the tool is provided. When a grinding operation is to be performed, the work piece is likewise pressed against the tool but macroscopic relative motion between the work piece and tool transversely to the axis of the tool is provided to bring the tool into engagement with the different parts of the work piece to be ground. In such operation the particular shape of the working face of the tool is relatively unimportant.

The purpose of the grooves 44 which, as will be noted, are disposed at an angle to the axis of the tool and tool holder, is to relieve pressure which builds up between the lower or working surface of the tool and a work piece when the equipment is operating. In addition these grooves facilitate access of the abrasive slurry to the surface to be cut.

In a trepanning operation there is no relative transverse motion between work piece and tool. When the trepanning operation starts the work will be cut away by the vibrated abrasive over the area covered by the lower or end surfaces of the tool wall, but will not be cut away over the area 50 at which the lower groove 44 intersects the working surface. However, as the operation continues, even assuming no wear of the tool, the wall of the groove above the area 50 will engage the slight protuberance or nub left on the work beneath the area 50 and prevent growth thereof beyond a height determined by the slope and width of the groove. There will ordinarily, however, be some tool wear and hence the location of the intersection of the groove with the cutting surface will shift about the periphery of the tool, but at any location the groove itself will serve to relieve pressure at the work surface. The upper groove of the tool of Fig. 1, when the tool wears to that extent, then serves in the same way to relieve pressure at the working area. Grooves such as the grooves 44 have been found in practice to increase substantially the cutting rate of any given operation.

It will be understood that liquid, usually water, carrying finely divided abrasive, is delivered to the working surface of a tool during a cutting or grinding operation. In trepanning, the communicating passages 46 and 48 in the tool holder provide means for delivery of fluid carrying abrasive to the interior of the tool to insure a plentiful supply of abrasive at the work area. The transverse passage 46, being located substantially at a nodal plane of the compressional standing waves can be connected by means of any suitable coupling means (not shown) to tubing or the like carrying the work fluid without interference with proper operation of the tool.

The embodiment of the invention illustrated in Figs. 2 and 2a differs from that shown in Fig. 1 primarily in the form of acoustical impedance transformer employed in the driver unit and in the means for attaching the tool holder to that transformer. The acoustical impedance transformer 54 of the driver unit of Fig. 2 has two generally cylindrical sections 54a and 54b and an intermediate relatively massive section 54c. The diameter of the upper section 54a is larger than that of section 54b but substantially less than that of section 54c. The walls of both cylindrical sections flare outwardly at their junction with the massive section 54c. The cylindrical casing 28 enclosing the upper section 54a of the transformer and the generator 2' is supported on the periphery of section 54c by bolts 26 as in the structure of Fig. 1. The generator of Fig. 2 may be identical with that of Fig. 1. In the particular embodiment illustrated no longitudinal slot for the winding is provided and the winding 14' encompasses the laminated body 10' and the sheets 12' of insulating material. A cap 18 of rubber or the like having closed air cells therein is provided on the upper end of the laminated body for reduction of water loading as in the case of the generator of Fig. 1.

The tool holder 6' of Fig. 2 is generally similar to that of Fig. 1 but is provided with different means for attachment to the driver unit. In Fig. 2 the coupling means between the tool 6' and section 54b of transformer 54 are particularly suitable for use when fixed orientation of a tool is desired and therefore the tool 8' of Figs. 2 and 2a has been illustrated as one suitable for forming a rectangular closed bottomed hole in a work piece. For such purpose the tool is solid and therefore the tool holder 6' is not shown as provided with passages, such as the passages 46 and 48 of Fig. 1 for internal feed of work fluid. The tool 8' has two relatively long sides 56 and two relatively short sides 58 of which at least the sides 56 are provided with pressure relieving grooves 44.

To permit the tool and tool holder to be detached from the driver unit and then again fastened thereto without change in orientation of the tool, the coupling means between tool holder and driver unit are such as to draw the parts together without relative rotation therebetween. This is effected by providing in cylindrical projection 38' of section 54b a transverse slot 60 and on projection 36' a tongue or male element 62 adapted to enter and conform to the slot 60. Opposite handed external screw threads are provided on the projections 36' and 38' so that, when a nut 40' having half right-handed and half left-handed internal threads is rotated about the projections 36' and 38', the tool holder is attached to or detached from the driver unit without rotation about its axis. To insure close coupling a disk 42' of copper or the like having a central slot for accommodation of the tongue 62 is interposed between the flat surfaces of the projections.

The embodiment of the invention illustrated in Fig. 3 differs from that of Fig. 1 only in the construction of the generator 2". In the generator of Fig. 3 each lamination 10" of the magnetostrictive transducer instead of being rectangular as in Fig. 1 is so formed that the upper half thereof has a greater width than the lower half. By this construction a measure of amplitude magnification is introduced into the generator itself as the amplitude of vibration at the upper or free end of the laminated body will be less than that at the loop of motion at which the body is secured to the upper end of the acoustical impedance transformer 4. The magnification obtained by the form of generator shown in Fig. 3, as well as that resulting from the various shapes of transformers and tool holders of Figs. 1 and 2, will be better understood from the discussion of acoustical impedance transformers now to be given in connection with Figs. 4 and 5.

In Fig. 4 an exponentially tapered acoustical impedance transformer is diagrammatically shown at 64 and compressional standing waves are assumed to be set up therein such that a loop of motion occurs at each end. In such a transformer, as is known, amplitude vibration at the small or ouptut end is larger than that at the input end. Calling M the magnification ratio, the relation for such a tapered element is—

$$M = K D_1 / D_2 \quad (1)$$

where K is a constant (theoretically equal to unity), and $D_1$ and $D_2$ are the input and output diameters respectively. The cross-sectional plane at which the node of motion occurs in such an element is that which divides the element into equal masses. Such plane is indicated by the line N of Fig. 4. It can be demonstrated analytically that the plane of maximum axial stress in such a transformer does not occur at the nodal plane but is displaced from the median plane C of the element toward the small end of the transformer a distance $d$ equal to the distance between the nodal and median planes. The curved line $a$ of the graph of Fig. 4 represents amplitude of vibration at any point on the axis of the transformer and the curve $s$ correspondingly represents the axial stress. Curve $a$ shows that amplitude is a maximum at the small end of the tapered transformer. Curve $s$ shows that the stress is zero at each end of the transformer, that is, at each loop of motion, and is a maximum at plane S.

The limitations of an acoustical impedance transformer of the continuously tapered type is thus apparent. For a given output diameter $D_2$ the magnification obtainable depends upon how large it is practicable to make the input diameter. For small output diameters, maximum stress occurs at a relatively small cross section where longitudinal vibrations are present and therefore reinforcement cannot be provided. The transformer 64 may be considered as a single section transformer and one that obtains a magnification by virtue of shape, specifically by virtue of the taper.

In Fig. 5 a transformer is indicated diagrammatically which can be generally called a multi-section transformer and more specifically one which obtains its magnification by virtue of a mass effect. The transformer of Fig. 5 comprises two cylindrical sections 66 and 68 of equal length but different mass. When standing waves are set up in such a structure the nodal plane and the plane of maximum axial stress coincide at the junction of the two sections. This is shown by the curves $a'$ and $s'$ of the graph of Fig. 5. If M is again taken as the amplitude magnification, the relation for the two section transformers of Fig. 5 can be shown to be—

$$M = K D_1^2 / D_2^2 \quad (2)$$

or more generally, and applicable also when sections 66 and 68 have other than circular cross-sections $$M = K A_1 / A_2 \quad (3)$$

where $A_1$ and $A_2$ are the cross-sectional input and output areas respectively.

In a two section transformer such as that idealized in Fig. 5 the junction of the sections is the dynamic center of the system. As the two sections have equal and opposite momenta, the average particle velocity of the section of less mass is higher than that of the section of larger mass and magnification of particle movement is thus obtained when the section of smaller mass is the output section. Due to the low particle velocity in the neighborhood of a nodal plane the contribution to the total momentum of either section of particles in this region is small. Hence from a theoretical standpoint, redistribution of mass in the nodal region should not substantially affect the magnification ratio. This has been completely substantiated in practice as addition or subtraction of mass in the neighborhood of the junction of the sections, as by provision of smoothly merging curved surfaces in this region or by addition of a radial flange, has been found to make no appreciable change in the magnification ratio, provided such mass redistribution or change is confined to a relatively short length of each section, say within 10% of the length of a section. Addition or redistribution of mass in this neighborhood at the nodal plane removes the discontinuity in the axial stress curve of the idealized two section transformer of Fig. 5 without substantially affecting the coincidence of nodal and maximum stress planes and, when mass is added, mechanical strength at such plane is enhanced.

The advantage of a two-section transmission line will now be apparent. Not only is magnification increased but also is coincidence of nodal and maximum stress planes obtained. This latter result means that reinforcement may be provided at the region of maximum stress without appreciable interference with proper transmission of longitudinal vibrations.

In reference now to Figs. 1, 2 and 3 it will be noted that the acoustical impedance transformer 54 of Fig. 2 and the tool holders 6 and 6' of Figs. 1 and 2 are of the general type of two section transformer above described with reference to Fig. 5 and therefore magnification of amplitude obtainable by these transformers is that given by Equation 3. The passages 48 of the tool holder 6 of Fig. 1 reduce the mass of section 6b thereof and also reduce the cross-sectional area of the output end of the tool holder. Accordingly the magnification obtainable by the tool holder has been enhanced by the provision of these passages, so that these passages serve not only to insure delivery of work fluid to the working area but also to increase the magnification factor of the tool holder.

The discussion of multiple section transformers up to this point has assumed that each section was cylindrical. It is not essential that these sections be cylindrical as the same general principle of design applies irrespective of the particular cross-sectional contours of the sections. It was for this reason that the more specific equation (Equation 2) specifying diameters of input and output cross-sectional areas was restated in the form of Equation 3, giving the relationship between input and output areas. Reference to Equation 3 will therefore demonstrate that the shape of the non-cylindrical generator 2" of Fig. 3 will, because of the difference in mass of the two sections thereof, also serve to introduce magnification of amplitude.

When a multi-section acoustical impedance transformer is to be constructed it is not necessary that the two sections be alike, that is, advantage can be taken both of the magnification introduced by taper as in the single section transformer of Fig. 4 and also of the magnification resulting from mass effect as in the two-section transformer of Fig. 5. In many cases combinations of cylindrical and tapered sections have been found to be of particular value. Figs. 6, 7, 8, 9 and 10 illustrate diagrammatically multi-section transformers in which the magnification of amplitude is obtained at least in part from the mass effect.

In Fig. 6 a transformer having a cylindrical input section 70 of a diameter $D_1$ and a tapered section 72 with a maximum diameter $D_3$ and minimum diameter $D_2$ is shown. The length of the section 70 corresponds to one-quarter of a wavelength of the compressional waves of a frequency to which the transformer is resonant, or more simply:

$$L_1 = c / 4f \quad (4)$$

where $c$ is the velocity of sound in the medium of which the transformer is made, $f$ is the frequency of the compressional waves, and $L_1$ the length of section 70. The length of section 72 is also equal to one-quarter of the wavelength and that length is dependent upon the taper.

Expressed mathematically, the length $L_2$ of the section 72 can be obtained from the equation—

$$D_3/D_2 = \exp(TL_2) \qquad (5)$$

where $T$ is the taper constant of the line. The magnification ratio $M$ of the transmission line of Fig. 6 is given by the following:

$$M = D_1^2/D_3D_2 \qquad (6)$$

In an acoustic transmission line such as that of Fig. 6 when $D_3$ is smaller than $D_1$ extremely high magnification ratios may be readily obtained. In such case, however, to obtain good stress resistance, reinforcement should be provided at the junction of the sections and as this section is that of a nodal plane of motion reinforcement will not interfere with proper transmission of vibration. With the two-section line of Fig. 6 for a given input diameter, $D_1$, it will be apparent that there are a great number of combinations of $D_2$ and $D_3$ than can be selected to keep $M$ the same value.

The transmission line or transformer of Fig. 7 is similar to that of Fig. 6 in that it is composed of a cylindrical section and a tapered section but in this case the input section 74 is tapered and the output section 76 is cylindrical. The lengths of the two sections are obtained, as in Fig. 6, from Equations 4 and 5, Equation 4 giving the formula for the length of the cylindrical section and Equation 5 for that of the tapered section. The magnification obtainable by the line of Fig. 7 is given by the equation—

$$M = D_1D_3/D_2^2 \qquad (7)$$

In Fig. 8 a two-section line which is similar in principle to that of Fig. 6 is shown. It comprises a cylindrical member 78 which has along its axis a conical or exponentially tapered cavity 80 extending from the output end 82 toward the input section. The inner end of cavity 80 is substantially at the region of the nodal plane so that the solid portion of the transformer between such plane and the input end comprises a first cylindrical section of the transformer as in the case of the transformer of Fig. 6. The output section has a decreasing cross-sectional area and hence corresponds to the tapered output section of the transformer of Fig. 6. This transformer is particularly adapted for use in trepanning, as will be apparent to those skilled in the art. As the internal cavity 80 terminates adjacent the node of the standing waves set up therein, an abrasive supply in liquid could be readily introduced through a transverse passage such as the passage 46 in the tool holder of Fig. 1.

The various transformers embodying the invention heretofore described have consisted of two sections only. The principle of the utilization of the mass effect is not limited to lines of two sections only. For example, four sections, cylindrical or of other cross-section, and each of one-eighth wavelength, could be employed as diagrammatically illustrated in Fig. 9 by the four-section transformer comprising the cylinders 84, 86, 88 and 90 of equal length and of diminishing diameter.

As heretofore indicated it is not essential that the various sections of a multiple section line be cylindrical in form. Rectangular or other cross-sections could be employed and such a two-section transformer is shown in Fig. 10 which shows an input section 92 of rectangular cross-section of uniform height but with exponentially tapered side walls. Magnification ratio $M$ for all forms, including that of Fig. 10, may be obtained by computing the ratio of the geometric mean area of the input section to the geometric mean area of the output section.

With the possible exception of the two-section line of Fig. 8, which is particularly adapted for use as a tool holder in trepanning operations, the transformers herein described could be employed in the equipment of the invention as part of the driver unit or as the tool holder. When employed in the driver unit the fact that the junction of two sections occurs at the nodal plane is an advantage in that enlargement of this section for providing the support of the apparatus can be readily effected without interference with the standing waves set up in the transformer. Moreover, as the plane of maximum stress occurs at such junction, the addition of mass at this location mechanically strengthens the transformer over the area where such strengthening is most needed. In Fig. 2, wherein the transformer 54 is a two-section cylindrical line, the relative massive section 54c is an example of such reinforcement at the region of maximum stress. Preferably the increase in thickness provided at such junction is radially tapered; that is, the thickness of the reinforcement in the longitudinal direction decreases with increase in radius. It will be noted that in each of Figs. 1, 2 and 3 the support means for the equipment provided at the nodal plane has a measure of radial taper.

It will be understood that when the acoustical impedance transformers of the invention are employed as tool holders, the length of tool to be brazed or otherwise secured to the end of transformer must be taken into consideration in the design of transformer as it is desired that the operating end of the tool will be at a loop of motion. Ordinarily with relatively short tools it is only necessary to make the length of the output section of the transformer slightly shorter than theoretically correct for a transformer without the tool, but when relatively deep holes are to be formed the length of tool may be appreciable. In such operation a tool such as that shown in Fig. 11 may be and preferably is employed. Such tool is designed to have a length equal to half a wavelength of the standing waves in the material of the tool.

The cross-sectional shape of the tool 96 of Fig. 11 will of course depend upon the desired cross-sectional shape of the hole to be formed in the work piece. Assuming a circular cross-section is desired, the tool will be cylindrical and in that case an external helical pressure relieving groove 97 may be conveniently provided. Such groove not only relieves pressure at the working surface but also provides means for ready removal in the work fluid of the particles of the work piece cut away during the drilling operation. The upper end of the tool is brazed to a tool holder 98 which may have the conformation of any of the multi-section transformers heretofore described. As some radial expansion and contraction is believed to occur at a nodal plane of motion it is preferred, when a hole of a greater depth than one-quarter of a wavelength is to be drilled, to so shape a long tool such as that of Fig. 11 that the cross-sectional area over the central part thereof is smaller than that at the working end. As but a very minute difference in cross-section is sufficient to prevent binding at the nodal plane, no attempt has been made to indicate such reduction of cross-section in the drawing.

The various tools heretofore discussed are those particularly suitable for use when the machining operation does not involve relative transverse motion between tool and work piece, such as occurs in a grinding operation. In Fig. 12 there is diagrammatically indicated in section one form of tool which has been found particularly efficacious when small areas in very hard material are to be ground, as for example in forming chip breakers in machine tools. A horizontal section of such tool is shown at 100 with a work piece 102 therebeneath on which a rectangular area 104 is to be ground. The tool is provided with a plurality of vertical grooves 105 in the side walls thereof, which grooves serve to insure plentiful supply of work fluid to the area to be ground. During the grinding operation the tool is vibrated at high frequency and through a small, substantially microscopic amplitude in a direction normal to the work piece, that is perpendicular to the plane of the drawing, and the work piece is vibrated at right angles to the direction of vibration of the tool at a relatively low rate and through an amplitude that is large, actually macroscopic, as compared to the amplitude of vibration of the tool. Any suitable means for so moving the work piece may be provided. For example, the work piece may be connected through a link 106 to an eccentric on a disk 108 rotated by a drive shaft 110. The amplitude of the transverse relative movement of the work and tool will depend upon the area to be ground. The amplitude must be at least as large as the width of any groove 105 in the tool to insure that all parts of the area to be ground will be subjected to the action of the abrasive.

The invention has now been described with reference to various embodiments thereof. Although the invention is particularly concerned with improved apparatus for practice of the ultrasonic process of the said Balamuth patent, obviously various features thereof could be advantageously employed wherever high frequency compressional waves are to be generated for any purpose. The new multi-section acoustical impedance transformers utilizing at least in part a mass effect for obtaining magnification of amplitude of vibration of compressional waves could be employed for heating, for under water transmission of signals or for homogenizing milk or other fluid. Although various specific tools, tool holders and acoustical impedance transformers have been illustrated and described, obviously the invention in its broadest aspect is not limited to the particular examples illustrated, as various combinations, permutations and changes of the described improvements could be made without departing from the teachings of the application and the scope of the accompanying claims.

The following is claimed:

1. In a vibratory mechanism, the combination comprising an electromechanical transducer for converting electrical oscillations to compressional waves and adapted to vibrate when energized at a predetermined frequency, a tool to be vibrated and means coupling said transducer to said tool for delivery of compressional vibrations thereto when said transducer is vibrating, said coupling means including at least one acoustic impedance transformer comprising two sections of substantially different mass and each of a length substantially equal to one-quarter wavelength of the compressional wave set up therein when the transducer is vibrating, the junction of said sections being substantially at the nodal plane of motion, said transformer serving to increase the amplitude of vibrations transmitted to said tool by virtue at least in part of a mass effect.

2. The combination according to claim 1 wherein at least one of said transformer sections is generally cylindrical.

3. The combination according to claim 2 wherein the other of said transformer sections is also generally cylindrical, the transformer at the junction of said sections having a greater diameter than that of either section for reinforcement at the nodal point of the zone of maximum stress of the transformer.

4. The combination according to claim 1 wherein said coupling means includes a second acoustic impedance transformer, one of said transformers being fixedly secured at one end to said transducer and the tool being fixedly secured to one end of the other of said transformers, the other ends of said transformers being detachably secured together.

5. The combination according to claim 1 wherein said transducer comprises a laminated body of magneto-strictive material and a winding coupled thereto and adapted to carry high frequency current, said body being so shaped that when a standing wave of compressional vibrations with an antinode at each end is set up therein by passage of high frequency current through said winding, the amplitude of vibration at one end is greater than the amplitude of vibration at the other end, said acoustic impedance transformer being secured to the first mentioned end of said body.

6. The combination according to claim 1 wherein one section of said transformer is cylindrical and the other section has an axial conical cavity extending from the tool end of the transformer toward the nodal plane, the cavity being so shaped that the cross sectional area of that section of the transformer continuously diminishes from the region of the nodal plane to the tool end of the transformer, the tool being a trepanning tool secured to the transformer about the periphery of the cavity.

7. The combination according to claim 1 wherein said transducer comprises a magneto-strictive transducer comprising a laminated body of magneto-strictive metal and cooperating energizing winding, one end of said body being fixed to said transformer, means for liquid cooling said body and a liquid impervious air containing protective cap secured to the other end of said body for reducing the fluid loading on said last mentioned end of the body.

8. The combination according to claim 1 wherein said coupling means includes a second acoustic impedance transformer adapted to increase the amplitude of vibrations transmitted thereby when said transducer is vibrating, one of said transformers being formed with a radially tapered flange intermediate its ends in the region of a nodal plane and means coupled to said flange for supporting said mechanism.

9. The combination according to claim 1 wherein said coupling means comprises two acoustic impedance transformers releasably attached together in end to end relation, the other end of one of said transformers being fixed to said transducer and the other end of the other transformer being fixed to said tool, the means for releasably attaching said transformers comprising an axially disposed externally threaded cylindrical projection on each of the cooperating ends of the transformers, said projections having end surfaces adapted to be brought into mating engagement, and means threadably engageable with the external threads on said projections for bringing said surfaces toward and away from each other, there being a deformable metal disc interposed between said surfaces.

10. The combination according to claim 9 wherein the end surface of one of said cylindrical projections has a non-circular reentrant opening therein and the end surface of the other of said cylindrical projections has a protruding part thereon adapted to mate with said opening, the external threads on said projections being oppositely handed whereby said transformers may be attached by the means threadably engaging the external threads on said projections without rotation of transformer about its axis, thereby insuring fixed orientation of the tool.

11. The combination according to claim 1 wherein said tool is of a length equal to an integral number of half wavelengths of the standing waves set up therein when said transducer is vibrating and wherein the cross sectional area of said tool is a maximum at its end remote from the coupling means.

12. The combination according to claim 1 wherein said tool has a work-engaging surface generally perpendicular to the direction of vibration of the tool and side walls terminating at said surface, there being at least one pressure relieving groove in a side wall of the tool intersecting said surface, the direction of said groove at its intersection with said surface being non-parallel to the direction of vibrations transmitted to said tool.

13. The combination according to claim 12 wherein said tool surface is generally circular and said side walls define a cylindrical surface, said groove extending helically in said cylindrical surface.

14. The combination according to claim 1 wherein said tool has a flat work-engaging surface perpendicular to the direction of vibration of the tool, said tool being formed with passages terminating at said surface for delivery of fluid carried abrasive thereto, support means for a workpiece, and means for oscillating said support means parallel to said surface at a rate that is small compared to the frequency of vibration of the tool and through an amplitude at least as great as the width of any groove.

15. The combination according to claim 1 wherein the end of the section of less mass of said transformer is secured to said tool and said transformer is formed in the region of the nodal plane with a passage extending from the outer surface of the transformer transversely into the transformer and with at least one longitudinal passage intersecting the transverse passage at one end and the tool end of the transformer at its other end, said passages serving for delivery of work fluid to the tool.

References Cited in the file of this patent

UNITED STATES PATENTS

| | | |
|---|---|---|
| 2,398,117 | Rost | Apr. 9, 1946 |
| 2,550,771 | Camp | May 1, 1951 |
| 2,573,168 | Mason | Oct. 30, 1951 |
| 2,580,716 | Balamuth | Jan. 1, 1952 |
| 2,632,858 | Calosi | Mar. 24, 1953 |
| 2,651,148 | Carwile | Sept. 8, 1953 |
| 2,680,333 | Calosi | June 8, 1954 |
| 2,704,333 | Calosi | Mar. 15, 1955 |

FOREIGN PATENTS

| | | |
|---|---|---|
| 581,123 | Great Britain | Oct. 2, 1946 |